(12) United States Patent
Hansson et al.

(10) Patent No.: US 9,177,074 B2
(45) Date of Patent: Nov. 3, 2015

(54) SYSTEM AND METHOD FOR CONFIRMING AUTHORSHIP OF DOCUMENTS

(75) Inventors: Othar Hansson, Sunnyvale, CA (US); Sagar Kamdar, Redwood City, CA (US); Michael Cassidy, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 271 days.

(21) Appl. No.: 13/608,758

(22) Filed: Sep. 10, 2012

(65) Prior Publication Data

US 2013/0066971 A1 Mar. 14, 2013

Related U.S. Application Data

(60) Provisional application No. 61/532,511, filed on Sep. 8, 2011.

(51) Int. Cl.
*G06F 17/30* (2006.01)
*G06F 21/64* (2013.01)

(52) U.S. Cl.
CPC .... *G06F 17/30899* (2013.01); *G06F 17/30887* (2013.01); *G06F 21/64* (2013.01)

(58) Field of Classification Search
CPC .............. G06F 17/30899; G06F 21/64; G06F 17/30887
USPC ....................................................... 709/204
See application file for complete search history.

(56) References Cited

U.S. PATENT DOCUMENTS

| | | | |
|---|---|---|---|
| 6,247,133 B1 | 6/2001 | Palage et al. | |
| 7,706,568 B2 * | 4/2010 | Yamazaki et al. | 382/100 |
| 7,743,409 B2 | 6/2010 | Gonzalez et al. | |
| 7,778,926 B1 | 8/2010 | Grinchenko et al. | |
| 7,856,444 B2 * | 12/2010 | Silverbrook et al. | 707/769 |
| 8,291,492 B2 | 10/2012 | McNally et al. | |

(Continued)

FOREIGN PATENT DOCUMENTS

| | | |
|---|---|---|
| JP | 2005-515135 A | 5/2005 |
| KR | 2009-0071645 A | 7/2009 |
| KR | 2009-0101935 A | 9/2009 |

OTHER PUBLICATIONS

Kyrnin, "How to Create a Mailto Link," May 3, 2005, http://webdesign.about.com/od/beginningtutorials/a/aa041700b.htm.*

(Continued)

*Primary Examiner* — Kevin Bates
*Assistant Examiner* — Chen-Liang Huang

(57) ABSTRACT

A system, computer-readable storage medium storing at least one program, and a computer-implemented method for confirming authorship of documents is presented. A document hosted on a website of a domain is accessed, where the document includes an authorship identifier asserting authorship of the document by an entity. Authorship of the document by the entity is conditionally confirmed when a profile for the entity is associated with the authorship identifier and when the profile for the entity indicates that the entity has confirmed that the authorship identifier is included in documents authored by the entity that are hosted on the first website of the first domain. Responsive to confirming authorship of the document by the entity, application of a confirmed authorship process to the document is permitted. Responsive to failing to confirm authorship of the document by the entity, application of the confirmed authorship process to the document is barred.

36 Claims, 7 Drawing Sheets

(56) References Cited

U.S. PATENT DOCUMENTS

| | | |
|---|---|---|
| 2005/0149507 A1* | 7/2005 | Nye .................................. 707/3 |
| 2007/0027815 A1 | 2/2007 | Sobel et al. |
| 2007/0033168 A1 | 2/2007 | Minogue et al. |
| 2007/0136797 A1 | 6/2007 | Tanabikiq et al. |
| 2007/0266097 A1 | 11/2007 | Harik et al. |
| 2009/0070435 A1 | 3/2009 | Abhyanker |
| 2009/0070881 A1 | 3/2009 | Yellepeddy et al. |
| 2009/0132689 A1 | 5/2009 | Zaltzman et al. |
| 2009/0157490 A1 | 6/2009 | Lawyer |
| 2009/0187988 A1 | 7/2009 | Hulten et al. |
| 2009/0204469 A1* | 8/2009 | Markram ........................... 705/9 |
| 2009/0328156 A1 | 12/2009 | Malaviarachchi et al. |
| 2010/0022231 A1 | 1/2010 | Heins et al. |
| 2010/0116880 A1 | 5/2010 | Stollman |
| 2010/0199334 A1 | 8/2010 | Ehrensvard et al. |
| 2011/0066526 A1* | 3/2011 | Watson ......................... 705/27.2 |
| 2011/0191416 A1* | 8/2011 | Glazer et al. .................. 709/204 |
| 2011/0282890 A1* | 11/2011 | Griffith .......................... 707/758 |
| 2012/0317505 A1* | 12/2012 | Schwartz et al. ............. 715/764 |
| 2014/0089322 A1 | 3/2014 | Garcia et al. |

OTHER PUBLICATIONS

Google Inc., International Preliminary Report on Patentability, PCT/US2012/054510, Mar. 12, 2014, 7 pgs.
Google Inc., International Preliminary Report on Patentability, PCT/US2012/054512, Mar. 12, 2014, 7 pgs.
Google Inc., International Search Report and Written Opinion, PCT/US2011/023391, Sep. 28, 2011, 10 pgs.
Google Inc., Office Action, AU 2011210532, Jan. 24, 2013, 3 pgs.
Anonymous, Authorship, web.archive.org/web/20110710214551 . . . , Jun. 30, 2011, 2 pgs.
Google Inc., ISR/WO, PCT/US2012/054510, Dec. 11, 2012, 9 pgs.
Google Inc., ISR/WO, PCT/US2012/054512, Dec. 11, 2012, 8 pgs.
Hansson, Authorship Markup and Web Search, Jun. 7, 2011, 6 pgs.
Google Inc., Communication enclosing the extended ESR, EP 11737870.3, Jun. 25, 2014, 7 pgs.

* cited by examiner

SYSTEM AND METHOD FOR CONFIRMING AUTHORSHIP OF DOCUMENTS

CROSS REFERENCE TO RELATED APPLICATION

This patent application claims the benefit of U.S. Provisional Application Ser. No. 61/532,511, filed Sep. 8, 2011, and titled, "SYSTEM AND METHOD FOR CONFIRMING AUTHORSHIP OF DOCUMENTS," which is incorporated herein by reference in its entirety.

TECHNICAL FIELD

The disclosed embodiments relate generally to confirming authorship of documents.

BACKGROUND

Content on websites often include authorship information. For example, an article may include a byline listing entities that authored the article. However, the authorship information may not be accurate or may not be valid. For example, an article may include authorship information asserting that a particular entity authored the article when in fact the article was not authored by the particular entity. Inaccuracies and/or invalidity of authorship information cause inaccuracies when obtaining search results and/or confusion to users when the search results are presented. Thus, it would be desirable to confirm authorship of content in website so that the entities that authored the content are properly identified.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings.

DESCRIPTION OF EXAMPLE EMBODIMENTS

The description that follows includes example systems, methods, techniques, instruction sequences, and computing machine program products that embody illustrative embodiments. In the following description, for purposes of explanation, numerous specific details are set forth in order to provide an understanding of the described embodiments. It will be evident, however, to those skilled in the art that some embodiments may be practiced without these specific details. In general, well-known instruction instances, protocols, structures and techniques have not been shown in detail.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The embodiments described herein provide techniques for confirming authorship of documents.

Figure 1:
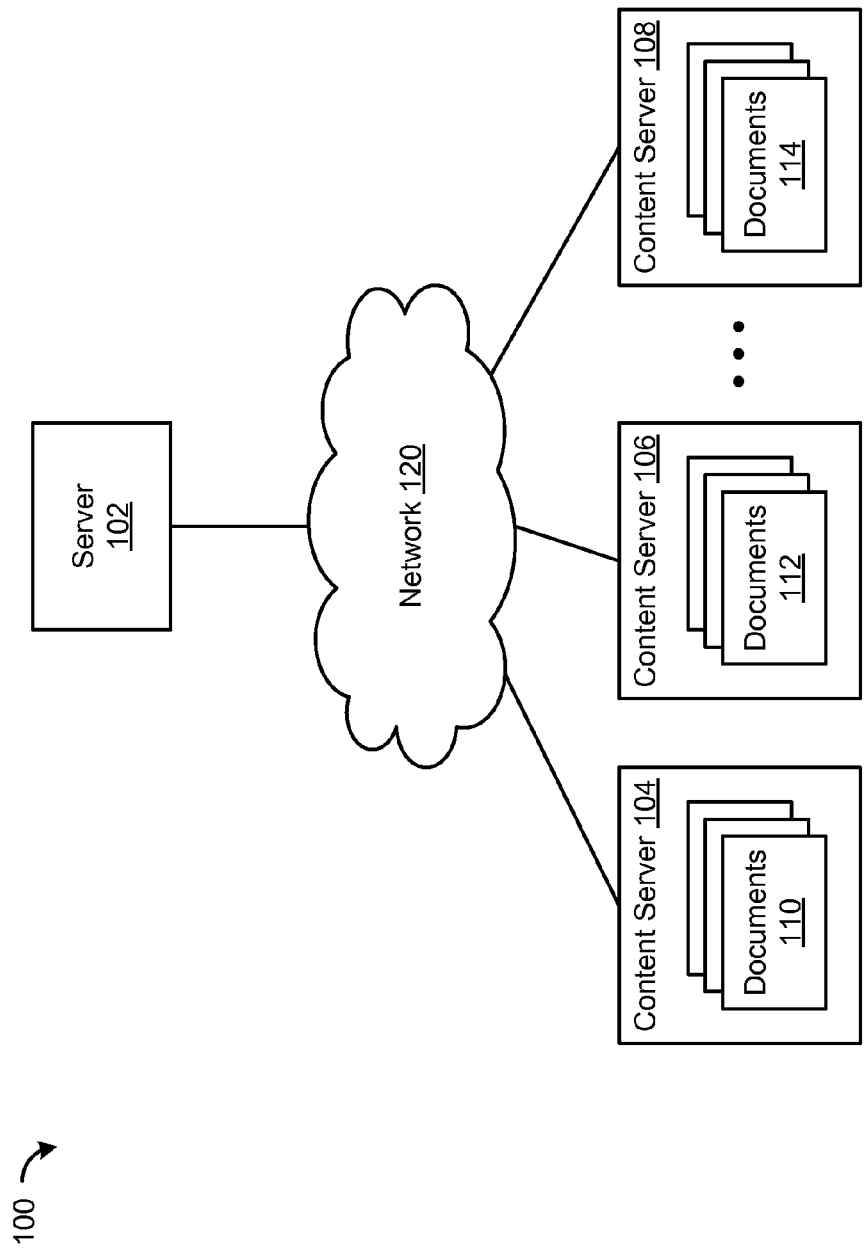
FIG. 1 is a block diagram illustrating a network system, according to some embodiments.

FIG. 1 is a block diagram illustrating a network system 100, according to some embodiments. The network system 100 includes a server system 102 coupled to content server systems 104, 106, and 108 via network 120. The network 120 can generally include any type of wired or wireless communication channel capable of coupling together computing nodes. This includes, but is not limited to, a local area network, a wide area network, or a combination of networks. In some embodiments, the network 120 includes the Internet.

Server system 102 (sometimes herein called server 102 for ease of reference, noting that some embodiments of server system 102 include multiple servers) is configured to confirm authorship of documents hosted on content server systems (sometimes herein called content servers for ease of reference) 104, 106, and 108, as described in more detail below with reference to FIGS. 2-8. In some embodiments, server 102 includes a search engine.

In some embodiments, content servers 104, 106, and 108 include web servers that host documents 110, 112, and 114 for websites that are accessible via network 120. The websites include, but are not limited to, news websites, blogs, social networking websites, academic websites, and corporate websites. At least a subset of the documents 110, 112, and 114 include content where each piece of content is authored by respective entities. An entity is defined to be a person, a group of people, or an organization. The content includes, but is not limited to, articles, blog entries, books, music, videos, literature, posts on online discussion forums, posts on social networking websites, and the like.

Note that although FIG. 1 shows a single server (e.g., the server 102) and three content servers (e.g., the content servers 104, 106, and 108), any number of servers and content servers may be present in network system 100. For example, each of server 102, content server 104, content server 106, and content server 108 may include a plurality of distributed servers. The plurality of distributed servers may provide load balancing and/or may provide low-latency points of access to other computer systems. The distributed servers may be located within a single location (e.g., a data center, a building, etc.) or may be geographically distributed across multiple locations (e.g., data centers at various geographical locations, etc.).

Also note that although the embodiments described herein refer to server 102, content server 104, content server 106, and content server 108, the embodiments may be applied to multiple servers and content servers. Furthermore, the functionality of any of server 102, content server 104, content server 106, and content server 108 may be implemented within a single server (or a set of distributed servers). For example, server 102 and content server 104 may be located on the same server (or the same set of distributed servers).

Figure 2:
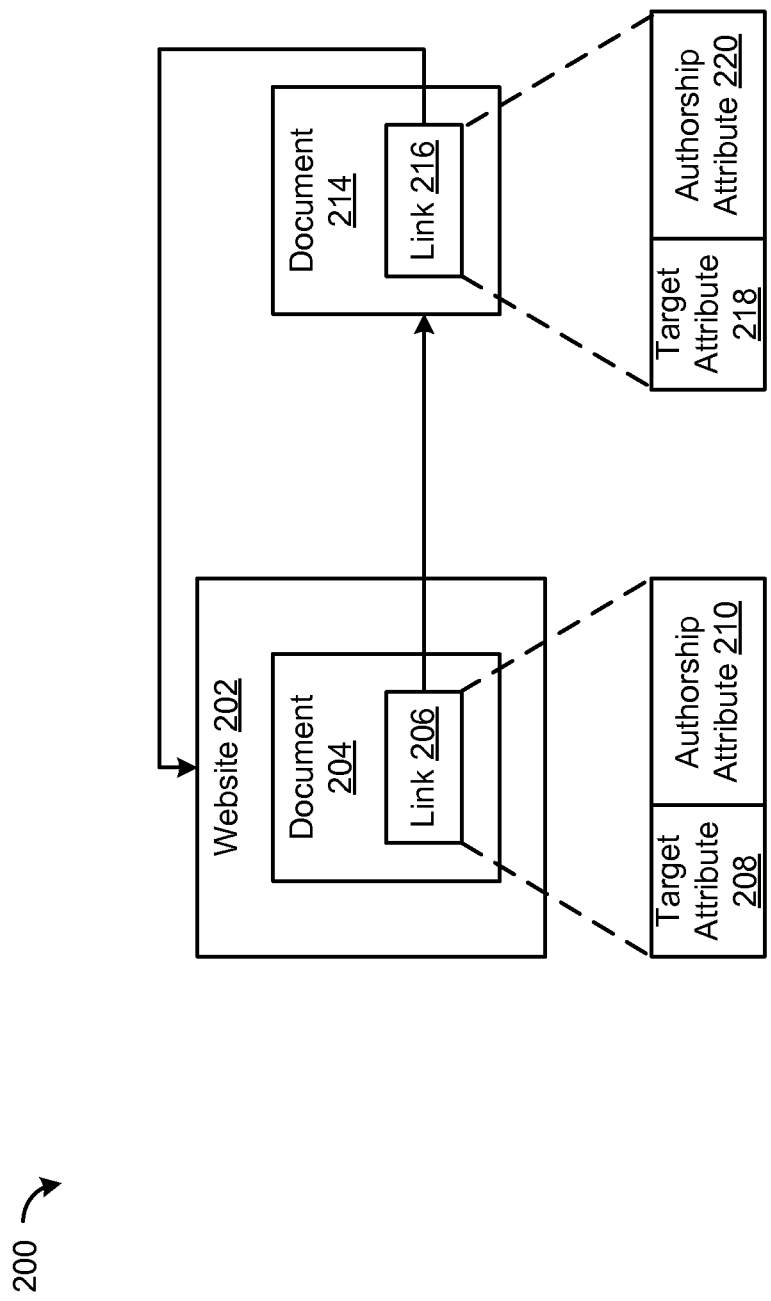
FIG. 2 is a block diagram illustrating authorship attributes that are usable to confirm authorship of documents, according to some embodiments.

In some embodiments, predefined authorship attributes included in links are used to confirm authorship of documents. FIG. 2 is a block diagram 200 illustrating authorship attributes that are usable to confirm authorship of documents, according to some embodiments. As illustrated in FIG. 2, a document 204 includes a link 206 and a document 214 includes a link 216. Documents 204 and 214 may be any of the documents from the documents 110, 112, and 114 hosted on the content servers 104, 106, and 108, respectively.

Document 204 is included in (i.e., stored at, or stored on, or accessible from) a website 202. A website includes a collection of documents that are authored, owned, or maintained by one or more entities. Furthermore, a website may be located in a domain (e.g., www.example.com), a subdomain (e.g., me.example.com), a subdirectory within a domain or subdomain (e.g., www.example.com/me/), and a set of dynamically-generated web pages in a domain or subdomain (e.g., www.example.com/profile?user_id=1001).

In some embodiments, document 214 is included in website 202 (i.e., the same website that includes document 204). In some embodiments, document 214 is included in a website that is separate and distinct from website 202. In some embodiments, document 214 is a profile page for the entity that document 214 asserts (e.g., via a byline or the like) is an author or contributor to document 214.

In some embodiments, link 206 includes a target attribute 208 and an authorship attribute 210. The target attribute 208 includes information identifying a target document to which link 206 refers, or information specifying a location at which a target document can be accessed. As illustrated in FIG. 2, the target document referred to by the target attribute 208 is document 214. In some implementations, the target attribute 208 includes a universal resource locator (URL). In some implementations, the target attribute 208 includes a universal resource identifier (URI). The authorship attribute 210 asserts authorship of document 204 by an entity associated with the target document to which link 206 refers. As illustrated in FIG. 2, the authorship attribute 210 of link 206 asserts that the entity associated with document 214 is an author of document 204. In some implementations, the authorship attribute 210 is rel="me". In some implementations, the authorship attribute 210 is rel="author". In some implementations, the authorship attribute 210 is represented by a URL parameter in the target URL (target attribute 208), such as a rel="author" parameter in the URL (e.g., http://www.example.com/article.php?article id=1001&rel="author"), instead of as a link parameter that is separate from the target attribute 208.

In some embodiments, link 216 includes a target attribute 218 and an authorship attribute 220. The target attribute 218 includes information identifying a target document to which link 216 refers, or information specifying a location at which a target document can be accessed. As illustrated in FIG. 2, the target document referred to by the target attribute 218 is the website 202. For example, the target attribute 218 may refer to a root document of a domain (e.g., www.example.com), root document of a subdomain (e.g., me.example.com), a root of a subdirectory within a domain or subdomain (e.g., www.example.com/me/), and root of a set of dynamically-generated web pages in a domain or subdomain (e.g., www.example.com/profile?user_id=1001). In some implementations, the target attribute 218 includes a universal resource locator (URL). In some implementations, the target attribute 218 includes a universal resource identifier (URI). The authorship attribute 220 indicates that the entity associated with document 214 is an author of or contributor to content at the website 202 to which the target attribute 218 refers. As illustrated in FIG. 2, the authorship attribute 220 of link 216 indicates that the entity associated with document 214 is an author of or contributor to content at website 202. In some implementations, the authorship attribute 220 is rel="contributor-to". In some circumstances, the authorship attribute 220 is rel="me", which may be used to indicate that the entire website 202 contains content by the entity associated with document 214.

The following discussion provides is an example of how an entity may use the authorship attribute 210 and the authorship attribute 220 to confirm authorship of a document. Assume that document 214 is a profile page for the entity that authored document 204 and that the entity that authored document 204 desires to provide confirmation that the entity did in fact author document 204. In order to do so, the entity that authored document 204 (1) includes link 216 in document (profile page) 214 and (2) includes link 206 in document 204. Assuming that document 214 has the URL "http://www.example.com/profiles/johndoe", link 206 is <a href="http://www.example.com/profiles/johndoe" rel="author">View my profile</a>, where rel="author" is the authorship attribute 210. Assuming that a root of the website that hosts document 204 has the URL "http://www.example2.com/articles/", link 216 is <a href="http://www.example2.com/articles" rel="contributor-to">Read my articles at example2.com </a>, where rel="contributor-to" is the authorship attribute 220. The loop formed by link 206 and link 216 confirms that the document is authored by the entity associated with document 214.

Note that although FIG. 2 shows only one link for each of the documents, each of the documents may include multiple links in which at least one of the links includes the authorship attribute 210 and/or the authorship attribute 220.

Figure 3:
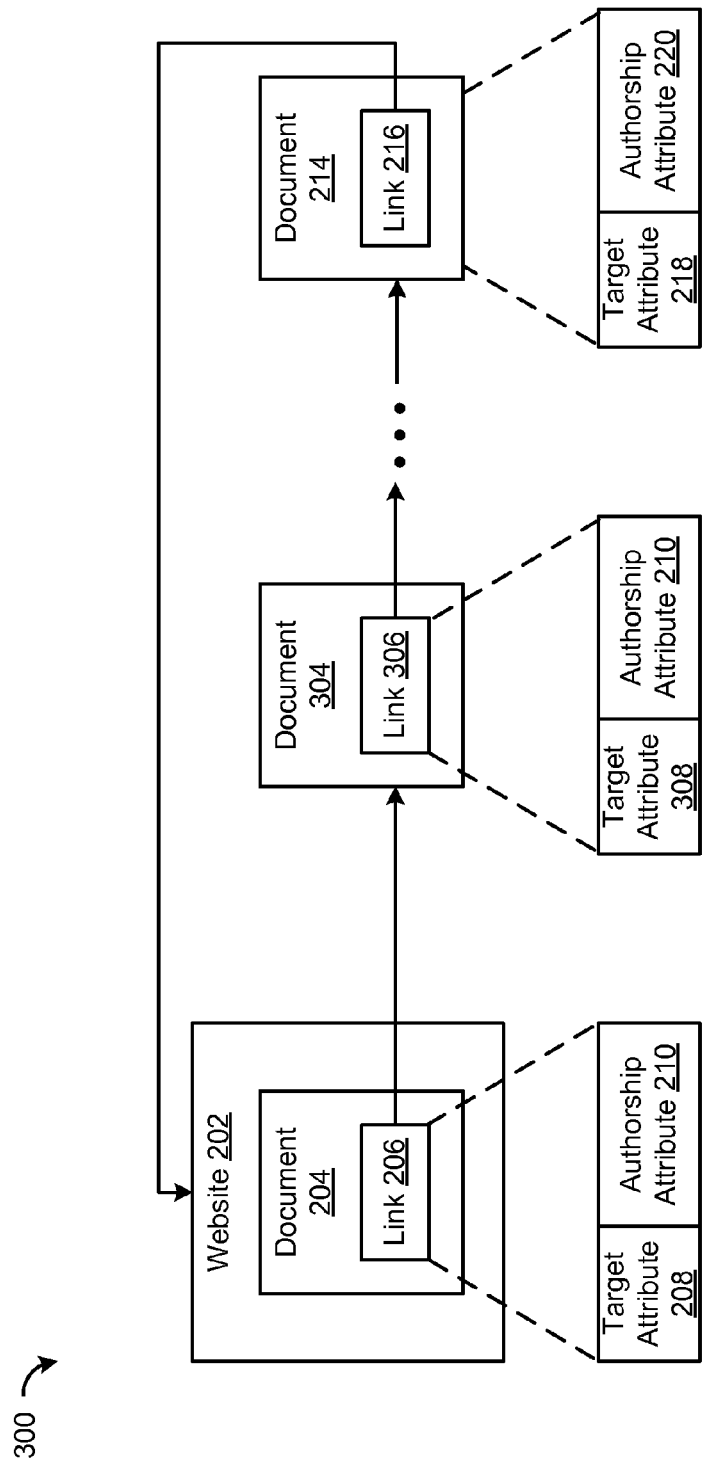
FIG. 3 is a block diagram illustrating authorship attributes that are usable to confirm authorship of documents, according to some embodiments.

FIG. 2 illustrates a technique for confirming authorship of documents when the authorship attribute 210 and the authorship attribute 220 are included in links in documents that directly link to each other. However, the authorship of documents may be confirmed when the authorship attribute 210 and the authorship attribute 220 are included in links in documents that are not directly linked to each other. FIG. 3 is a block diagram 300 illustrating authorship attributes that are usable to confirm authorship of documents, according to some embodiments. FIG. 3 is similar to FIG. 2 except that in FIG. 3, the target attribute 208 of link 206 refers to a document 304, which in turn includes a link 306 having a target 308 that refers to document 214. Links 206, 306, and 216 form a chain of links to documents. When confirming authorship of document 204, server 102 traverses links in the chain of links until document 214 that includes the authorship attribute 220 (e.g., the rel="contributor-to" attribute) is identified. In general, any number of links included in documents may exist between document 204 and document 214. Links 206 and 306 (and any other link in the chain of links between links 206 and 216) include the authorship attribute 210, which is the basis for establishing a chain of links. In other words, the chain of links is established by a series of links in which a predecessor document includes a predecessor link that has the authorship attribute 210 and the target of the predecessor link is a successor document that includes a successor link that has the authorship attribute 210. In some embodiments, document 304 (and any document between documents 204 and 214) is included in the website 202. In some embodiments, document 304 (and any document between documents 204 and 214) is included in a website that is separate and distinct from website 202.

The confirmation techniques discussed with reference to FIGS. 2 and 3 analyze attributes included in links to confirm authorship of documents. The confirmation techniques discussed below with reference to FIGS. 4 and 5 use authorship identifiers to confirm authorship of documents.

Figure 4:
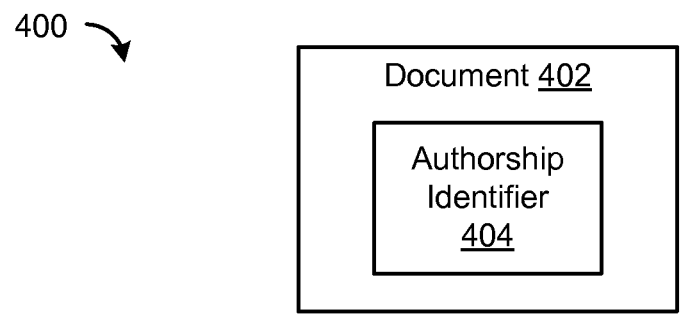
FIG. 4 is a block diagram illustrating an authorship identifier that is usable to confirm authorship of documents, according to some embodiments.

FIG. 4 is a block diagram 400 illustrating an authorship identifier that is usable to confirm authorship of documents, according to some embodiments. A document 402 includes an authorship identifier 404 asserting authorship of the document 404 by an entity. In some embodiments, the authorship identifier 404 is an email address of the entity that authored the document 402. In some embodiments, the authorship identifier 404 is byline of the entity that authored the document 402. The fact that the document 402 includes the authorship identifier 404 is not sufficient by itself to confirm that the document 402 is authored by the entity. Thus, in some embodiments, the server 102 uses information from a profile for the entity that is associated with the authorship identifier 404 to confirm that the entity authored the document 402. The entity that is associated with the authorship identifier 404 is confirmed to be the author of the document 402 when the profile for the entity indicates that the entity has confirmed that the authorship identifier 404 is included in documents authored by the entity that are hosted on a website (e.g., website 202).

Figure 5:
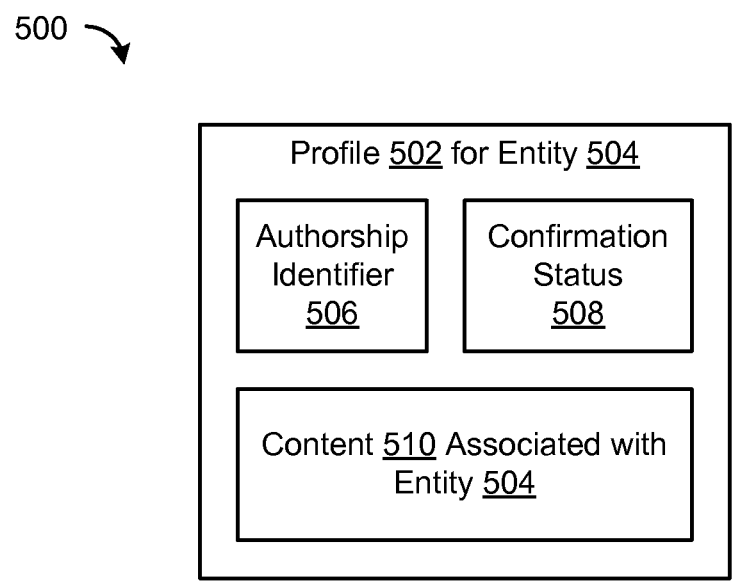
FIG. 5 is a block diagram illustrating a profile for an entity, according to some embodiments.

FIG. 5 is a block diagram 500 illustrating profile 502 for an entity 504, according to some embodiments. The profile 502 for entity 504 includes an authorship identifier 506 that is associated with at least one website and a confirmation status 508 for the authorship identifier 506 that indicates whether entity 504 has confirmed that the authorship identifier 506 is included in documents authored by entity 504 that are hosted on the website. When the authorship identifier 506 corresponds to an authorship identifier included in documents hosted on the at least one website, entity 504 is confirmed to be the author of the documents hosted on the at least one website. For example, when the authorship identifier 506 has been confirmed to be associated with a website that hosts the document 402, entity 504 is confirmed to be the author of document 402.

In some embodiments, when the authorship identifier 506 is an email address in a domain that hosts a website including documents authored by entity 504, server 102 sends a confirmation email that includes a confirmation link (and/or a confirmation code) to the email address. When entity 504 clicks on the confirmation link (and/or enters the confirmation code on a predetermined webpage), entity 504 confirms that the email address is included in documents authored by entity 504 that are hosted on the website of the domain. When documents hosted on the website of the domain include the email address, entity 504 is confirmed to be author of the documents In some embodiments, after the email address has been confirmed, entity 504 provides a byline that is included in documents authored by entity 504 that are hosted on the website of the domain. In these embodiments, when documents hosted on the website of the domain include the byline, entity 504 is confirmed to be author of the documents.

In some embodiments, the profile 502 for entity 504 includes content 510 associated with entity 504. For example, profile 502 may include information relating to articles (e.g., links to the articles, titles of the articles, summaries of the articles) that entity 504 has authored. In some embodiments, profile 502 is a profile on a social networking website.

In some embodiments, the authorship of a document is confirmed using both the authorship identifier and the authorship attributes included in links.

Figure 6:
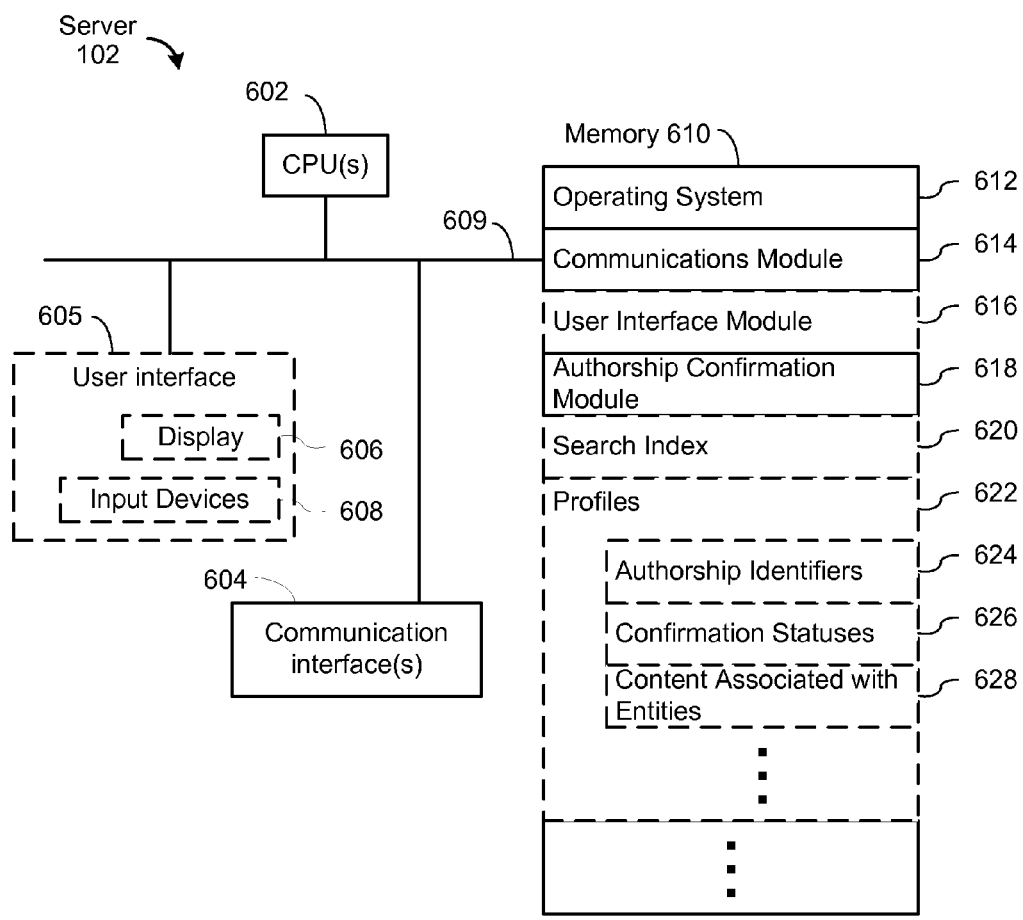
FIG. 6 is a block diagram illustrating a server system, according to some embodiments.

FIG. 6 is a block diagram illustrating server system 102, according to some embodiments. The server system 102 typically includes one or more processing units (CPU's, sometimes called processors) 602 for executing programs (e.g., programs stored in memory 610), one or more network or other communications interfaces 604, memory 610, and one or more communication buses 609 for interconnecting these components. The communication buses 609 may include circuitry (sometimes called a chipset) that interconnects and controls communications between system components. Server system 102 optionally includes (but typically does not include) a user interface 605 comprising a display device 606 and input devices 608 (e.g., keyboard, mouse, touch screen, keypads, etc.). Memory 610 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 610 optionally includes one or more storage devices remotely located from the CPU(s) 602. Memory 610, or alternately the non-volatile memory device(s) within memory 610, comprises a non-transitory computer readable storage medium. In some embodiments, memory 610 or the computer readable storage medium of memory 610 stores the following programs, modules and data structures, or a subset thereof:

an operating system 612 that includes procedures for handling various basic system services and for performing hardware dependent tasks;

a communication module 614 that is used for connecting the server 102 to other computers via the one or more communication interfaces 604 (wired or wireless) and one or more communication networks, such as the Internet, other wide area networks, local area networks, metropolitan area networks, and so on;

an optional user interface module 616 that receives commands from the user via the input devices 608 and generates user interface objects in the display device 606;

an authorship confirmation module 618 that confirms authorship of documents, as described herein;

an optional search index 620 that facilitates identifying search requests, the search index 620 including information relating to documents, authorship of the documents, and a corresponding confirmation status of the authorship of the documents (e.g., confirmed authorship, non-confirmed authorship); and optional profiles 622 of entities that include authorship identifiers 624 (e.g., the authorship identifier 404, the authorship identifier 506), confirmation statuses 626 of the authorship identifiers 624 (e.g., the confirmation status 508), and content associated with the entity 628 (e.g., the content 510 associated with the entity 504), as described herein.

In some embodiments, search index 620 is located on a server that is separate and distinct from server system 102. In some embodiments, the profiles 622 are located on a server that is separate and distinct from server system 102.

Each of the above identified modules, applications or programs corresponds to a set of instructions, executable by the one or more processors (e.g., CPUs 602) of content server 700, for performing a function described above. The above identified modules, applications or programs (i.e., sets of instructions) need not be implemented as separate software programs, procedures or modules, and thus various subsets of these modules may be combined or otherwise re-arranged in various embodiments. In some embodiments, memory 610 stores additional modules and data structures not described above.

Although FIG. 6 shows a "server," FIG. 6 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers. The actual number of servers used to implement server system 102 and how features are allocated among them will vary from one implementation to another, and may depend in part on the amount of data traffic that the system must handle during peak usage periods as well as during average usage periods.

Figure 7:
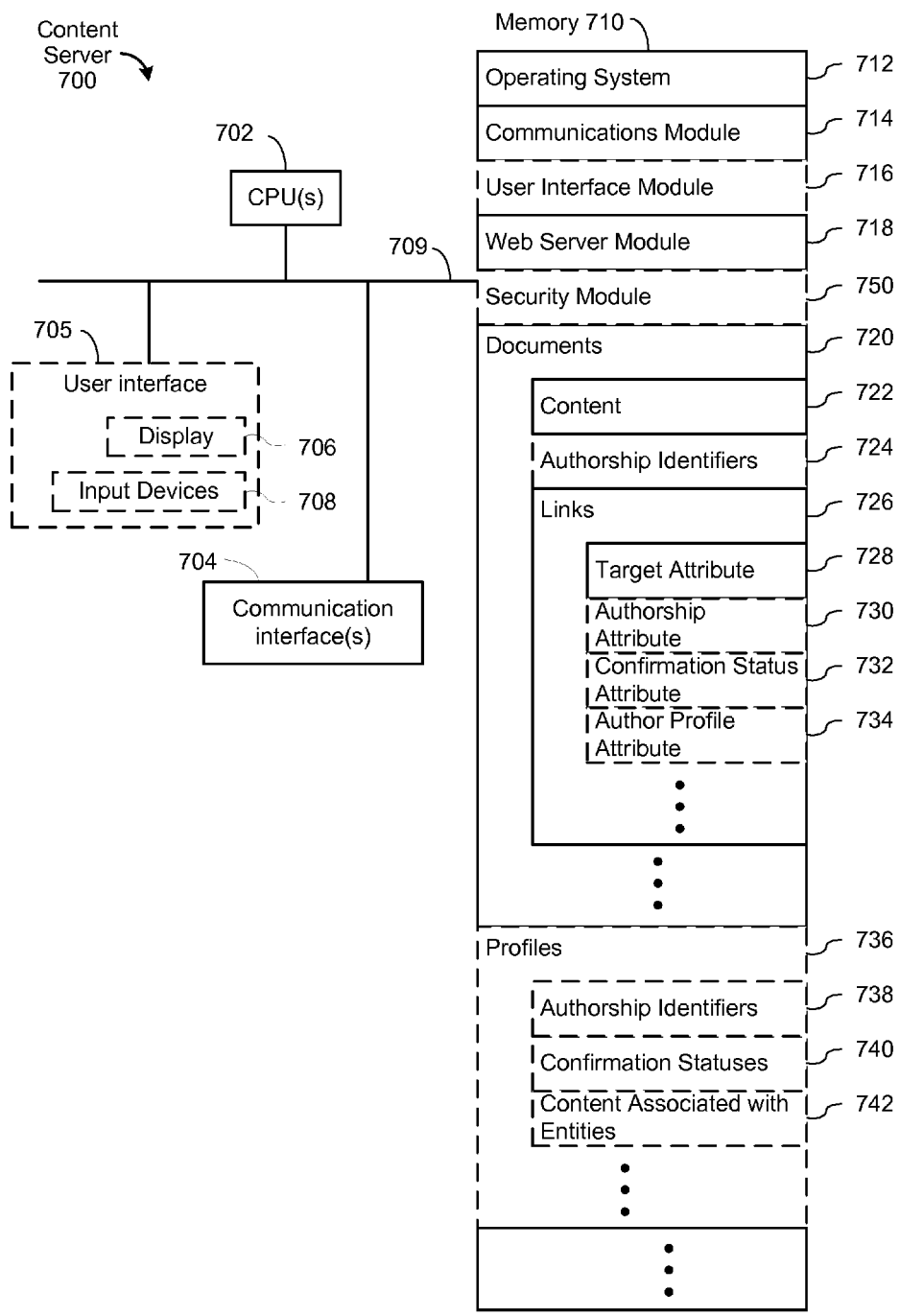
FIG. 7 is a block diagram illustrating a content server system, according to some embodiments.

FIG. 7 is a block diagram illustrating a content server 700, according to some embodiments. The content server 700 can be any of the content servers 104, 106, and 108 in FIG. 1. The content server 700 typically includes one or more processing units (CPU's, sometimes called processors) 702 for executing programs (e.g., programs stored in memory 710), one or more network or other communications interfaces 704, memory 710, and one or more communication buses 709 for interconnecting these components. The communication buses 709 may include circuitry (sometimes called a chipset) that interconnects and controls communications between system components. The content server 700 optionally includes (but typically does not include) a user interface 705 comprising a display device 706 and input devices 708 (e.g., keyboard, mouse, touch screen, keypads, etc.). Memory 710 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 710 optionally includes one or more storage devices remotely located from the CPU(s) 702. Memory 710, or alternately the non-volatile memory device(s) within memory 710, comprises a non-transitory computer readable storage medium. In some embodiments, memory 710 or the computer readable storage medium of memory 710 stores the following programs, modules and data structures, or a subset thereof:

an operating system 712 that includes procedures for handling various basic system services and for performing hardware dependent tasks;

a communication module 714 that is used for connecting the content server 700 to other computers via the one or more communication interfaces 704 (wired or wireless) and one or more communication networks, such as the Internet, other wide area networks, local area networks, metropolitan area networks, and so on;

an optional user interface module 716 that receives commands from the user via the input devices 708 and generates user interface objects in the display device 706;

a web server module 718 that responds to requests for documents 720 received from other computer systems;

documents 720 that include content 722 authored by entities, optional authorship identifiers 724 (e.g., the authorship identifier 404, the authorship identifier 506), links 724 that each include a target attribute 728 (e.g., the target attribute 208, the target attribute 218, the target 308), an optional authorship attribute 730 (e.g., the authorship attribute 210, the authorship attribute 210), an optional confirmation status attribute 732 indicating whether the authorship of the document is confirmed or not, and an optional author profile attribute 734 that provides a link to a profile of the entity that authored the document, as described herein; and optional profiles 736 of entities that include authorship identifiers 738 (e.g., the authorship identifier 404, the authorship identifier 506), confirmation statuses 740 of the authorship identifiers 738 (e.g., the confirmation status 508), and content 742 associated with the entities (e.g., the content 510 associated with the entity 504), as described herein.

Content server 700 optionally further includes a security module 750 for ensuring that content that is stored at or by content server 700 and that includes an indicia of authorship (e.g., byline or email address), is received from or on behalf of the entity associated that the indicia of authorship. Security module 750 is configured to prevent, or substantially prevent, storage on content server 700 of content having false indicia of authorship.

Each of the above identified modules, applications or programs corresponds to a set of instructions, executable by the one or more processors (e.g., CPUs 702) of content server 700, for performing a function described above. The above identified modules, applications or programs (i.e., sets of instructions) need not be implemented as separate software programs, procedures or modules, and thus various subsets of these modules may be combined or otherwise re-arranged in various embodiments. In some embodiments, memory 710 stores additional modules and data structures not described above.

Although FIG. 7 shows a "content server," FIG. 7 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 7 could be implemented on single servers and single items could be implemented by one or more servers. The actual number of servers used to implement a content server and how features are allocated among them will vary from one implementation to another, and may depend in part on the amount of data traffic that the system must handle during peak usage periods as well as during average usage periods.

Confirming Authorship of Documents

Figure 8:
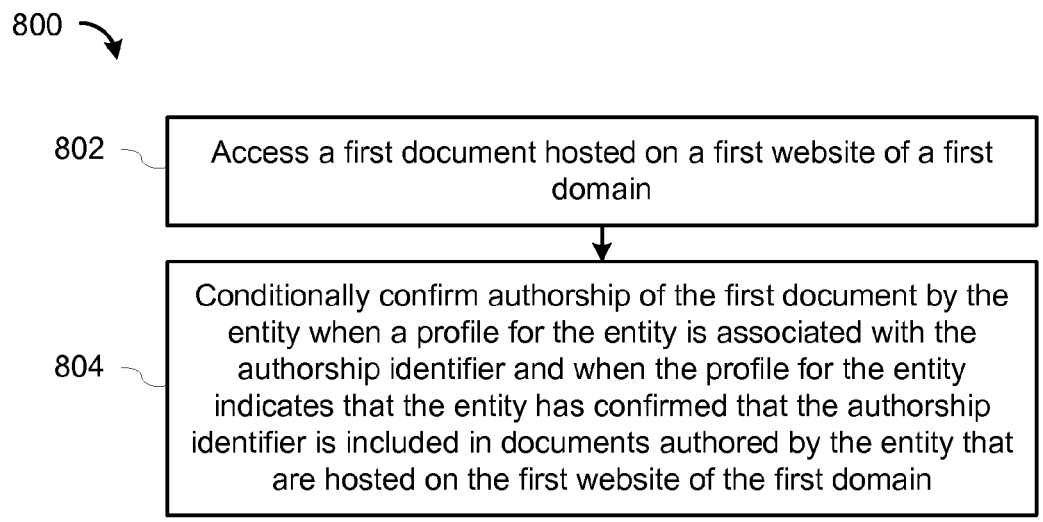
FIG. 8 is a flowchart of a method for confirming authorship of documents, according to some embodiments.

FIG. 8 is a flowchart of a method 800 for confirming authorship of documents, according to some embodiments. The authorship confirmation module 618 accesses (802) a first document (e.g., the document 402) hosted on a first website (e.g., the website 202) of a first domain, where the first document includes an authorship identifier (e.g., the authorship identifier 404) asserting authorship of the first document by an entity (e.g., the entity 504).

The authorship confirmation module 618 conditionally confirms authorship of the first document by the entity when a profile for the entity (e.g., the profile 502 for the entity 504) is associated with the authorship identifier and when the profile for the entity indicates that the entity has confirmed that the authorship identifier is included in documents authored by the entity that are hosted on the first website of the first domain. For example, if the profile 502 for the entity 504 is associated with the authorship identifier 404 (e.g., the authorship identifier 506 corresponds to the authorship identifier 404) and the confirmation status 508 indicates that the entity 504 has confirmed that the authorship identifier 506 is included in documents authored by the entity 504 that are hosted on the website 202, the authorship confirmation module 618 confirms that the entity associated with the authorship identifier 404 (e.g., the entity 504) authored the document 402. In some embodiments, the authorship identifier in the profile is publically viewable.

In some embodiments, the authorship confirmation module 618 determines that the first document has a non-confirmed authorship when no profile for the entity associated with the authorship identifier can be found or when the profile for the entity does not indicate that the entity has confirmed that the authorship identifier is included in documents authored by the entity.

In some embodiments, the authorship identifier includes an email address for a purported author of or contributor to the first document, where the email address is an email address in the first domain. In these embodiments, prior to conditionally confirming the authorship of the first document, the authorship confirmation module 618 requests that the entity confirm that the email address associated with the profile for the entity is the email address that the entity includes in documents authored by the entity. For example, the authorship confirmation module 618 may send a confirmation email that includes a confirmation link (and/or a confirmation code) to the email address. When the entity clicks on the confirmation link (and/or enters the confirmation code on a predetermined webpage), the entity confirms that the email address is included in documents authored by the entity that are hosted on the first website of the first domain. In some implementations, these embodiments require that the email address is an email address in the domain in which the first document is hosted. For example, if the first document is hosted on www.example.com, the email address must be in the example.com domain (e.g., johndoe@example.com). In some implementations, these embodiments require that the email address is included in a document in an unambiguous way and the entity has confirmed the email address associated with the profile of the entity (as described above). In one example, the first document includes an email address johndoe@example.com within a predetermined distance from a byline for the first document and the profile for the entity is associated with the confirmed email address johndoe@example.com. Alternatively, the first document includes an email link targeting an email address johndoe@example.com that also includes an authorship attribute rel="author" and the profile for entity is associated with the confirmed email address johndoe@example.com.

In some embodiments, the authorship identifier includes a byline for a purported author of or contributor to the first document as the byline appears in documents hosted at least one domain. In these embodiments, prior to conditionally confirming the authorship of the first document, the authorship confirmation module 618 requests that the entity confirm that the byline associated with the profile for the entity is the byline that the entity includes in documents authored by the entity. In one example, the authorship confirmation module 618 requests that the entity provide a byline that is included in documents that are hosted on the first website of the first domain and that are authored by the entity. In some implementations, the entity provides a byline by providing a name of the entity (e.g., "John Doe"). In these implementations, the confirmation module 618 identifies occurrences of the name (or close matches) within documents that indicate that the named entity is an author of the document. In some implementations, the authorship confirmation module 618 first requests that the entity confirm that an email address associated with the profile for the entity is the email address that the entity includes in documents in the first website of the first domain that are authored by the entity, as discussed above. The confirmation of the email address confirms that the entity is an author of or contributor to documents hosted on the first website of the first domain, and therefore, a byline provided by the entity can be trusted to be a byline that the entity includes in documents that are hosted on the first website of the first domain and that are authored by the entity.

In some embodiments, the authorship identifier includes an email link to an email address for a purported author of or contributor to the first document, where the email link includes a predefined authorship attribute (e.g., the authorship attribute 220). For example, the email link may be <a href="mailto:johndoe@example.com" rel="author">Email me</a>. In these embodiments, prior to conditionally confirming the authorship of the first document, the authorship confirmation module 618 requests that the entity confirm that the email address associated with the profile for the entity is the email address that the entity includes in documents authored by the entity, as discussed above.

After confirming the authorship of the document, several operations may be performed. In some embodiments, responsive to confirming authorship of the first document by the entity, the authorship confirmation module 618 adds the first document (e.g., document 402) to the profile for the entity (e.g., the profile 502 for the entity 504).

In some embodiments, responsive to confirming authorship of the first document by the entity, the authorship confirmation module 618 adds the first document (e.g., the document 402) to a social networking webpage for the entity.

In some embodiments, responsive to confirming authorship of the first document by the entity, the authorship confirmation module 618 adds information relating to the first document (e.g., document 402) to a webpage including information relating to documents that the entity authored. In some implementations, the webpage including information relating to documents that the entity authored is an author webpage on the first website, an author webpage on a social networking website, a blog for the author, or a search result web page.

In some embodiments, responsive to confirming authorship of the first document by the entity, the authorship confirmation module 618 associates the first document (e.g., the document 402) with the entity (e.g., the entity 504) in a search index (e.g., the search index 620).

In some embodiments, the methods illustrated in FIG. 8 are governed by instructions that are stored in a computer readable storage medium and that are executed by at least one processor of at least one server. Each of the operations shown in FIG. 8 corresponds to instructions stored in a non-transitory computer memory or computer readable storage medium. In various implementations, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the embodiment(s).

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A computer-implemented method for confirming authorship of documents, performed on a server having at least one processor and memory storing at least one program for execution by the at least one processor to perform the method, comprising:
   conditionally confirming entity authorship of a first document hosted on a first website of a first domain, the first document including an authorship identifier associated with the domain and unique to the entity but not the first document, when:
      (i) a profile for the entity is associated with the authorship identifier, and
      (ii) the profile for the entity includes a confirmation status that indicates that the entity has confirmed that the authorship identifier is included in documents authored by the entity that are hosted on the first website of the first domain;
   responsive to confirming authorship of the first document by the entity, permitting application of a confirmed authorship process to the first document; and
   responsive to failing to confirm authorship of the first document by the entity, barring application of the confirmed authorship process to the first document.

2. The computer-implemented method of claim 1, further comprising determining that the first document has a non-confirmed authorship when no profile for the entity associated with the authorship identifier can be found or when the profile for the entity does not include the confirmation status for the authorship identifier.

3. The computer-implemented method of claim 1, wherein the authorship identifier includes an email address for a purported author of or contributor to the first document, and wherein the email address is an email address in the first domain.

4. The computer-implemented method of claim 3, wherein prior to conditionally confirming the authorship of the first document, the method includes requesting that the entity confirm that the email address associated with the profile for the entity is the email address that the entity includes in documents authored by the entity.

5. The computer-implemented method of claim 1, wherein the authorship identifier includes a byline for a purported author of or contributor to the first document as the byline appears in documents hosted at the first domain.

6. The computer-implemented method of claim 5, wherein prior to conditionally confirming the authorship of the first document, the method includes requesting that the entity confirm that the byline associated with the profile for the entity is the byline that the entity includes in documents authored by the entity hosted at the first domain.

7. The computer-implemented method of claim 1, wherein the authorship identifier includes an email link to an email address for a purported author of or contributor to the first document, and wherein the email address is in an email address in the first domain and the email link includes a predefined authorship attribute.

8. The computer-implemented method of claim 7, wherein prior to conditionally confirming the authorship of the first document, the method includes requesting that the entity confirm that the email address associated with the profile for the entity is the email address that the entity includes in documents authored by the entity.

9. The computer-implemented method of claim 1, wherein the profile is a profile web-page hosted at the first domain and wherein the authorship of the first document is confirmed and the confirmed authorship process comprises adding the first document to the profile web-page for the entity.

10. The computer-implemented method of claim 1, wherein the authorship of the first document is confirmed and the confirmed authorship process comprises adding the first document to a social networking web-page for the entity.

11. The computer-implemented method of claim 1, wherein the authorship of the first document is confirmed and the confirmed authorship process comprises adding information relating to the first document to a web-page including information relating to documents that the entity authored.

12. The computer-implemented method of claim 1, wherein the authorship of the first document is confirmed and the confirmed authorship process comprises associating the first document with the entity in a search index.

13. A system to confirm authorship of documents, comprising:
   at least one processor;
   memory; and
   at least one program stored in the memory and executable by the at least one processor, the at least one program comprising instructions to:
      conditionally confirm entity authorship of a first document hosted on a first website of a first domain, the first document including an authorship identifier associated with the domain and unique to the entity but not the first document, when:

(i) a profile for the entity is associated with the authorship identifier, and
(ii) the profile for the entity includes a confirmation status that indicates that the entity has confirmed that the authorship identifier is included in documents authored by the entity that are hosted on the first website of the first domain;
responsive to confirming authorship of the first document by the entity, permit application of a confirmed authorship process to the first document; and
responsive to failing to confirm authorship of the first document by the entity, bar application of the confirmed authorship process to the first document.

14. The system of claim 13, further comprising instructions to determine that the first document has a non-confirmed authorship when no profile for the entity associated with the authorship identifier can be found or when the profile for the entity does not include the confirmation status for the authorship identifier.

15. The system of claim 13, wherein the authorship identifier includes an email address for a purported author of or contributor to the first document, and wherein the email address is an email address in the first domain.

16. The system of claim 15, wherein prior to conditionally confirming the authorship of the first document, the at least one program includes instructions to request that the entity confirm that the email address associated with the profile for the entity is the email address that the entity includes in documents authored by the entity.

17. The system of claim 13, wherein the authorship identifier includes a byline for a purported author of or contributor to the first document as the byline appears in documents hosted at the first domain.

18. The system of claim 17, wherein prior to conditionally confirming the authorship of the first document, the at least one program includes instructions to request that the entity confirm that the byline associated with the profile for the entity is the byline that the entity includes in documents authored by the entity hosted at the first domain.

19. The system of claim 13, wherein the authorship identifier includes an email link to an email address for a purported author of or contributor to the first document, and wherein the email address is an email address in the first domain and the email link includes a predefined authorship attribute.

20. The system of claim 19, wherein prior to conditionally confirming the authorship of the first document, the at least one program includes instructions to request that the entity confirm that the email address associated with the profile for the entity is the email address that the entity includes in documents authored by the entity.

21. The system of claim 13, wherein the profile is a profile web-page hosted at the first domain and wherein the authorship of the first document is confirmed and the confirmed authorship process comprises adding the first document to the profile web-page for the entity.

22. The system of claim 13, wherein the authorship of the first document is confirmed and the confirmed authorship process comprises adding the first document to a social networking web-page for the entity.

23. The system of claim 13, wherein the authorship of the first document is confirmed and the confirmed authorship process comprises adding information relating to the first document to a web-page including information relating to documents that the entity authored.

24. The system of claim 13, wherein the authorship of the first document is confirmed and the confirmed authorship process comprises associating the first document with the entity in a search.

25. A non-transitory computer readable storage medium storing at least one program configured for execution by at least one processor of a computer system, the at least one program comprising instructions to:
conditionally confirm entity authorship of a first document hosted on a first website of a first domain, the first document including an authorship identifier associated with the domain and unique to the entity but not the first document when:
(i) a profile for the entity is associated with the first domain and with the authorship identifier, and
(ii) the profile for the entity includes a confirmation status indicates that the entity has confirmed that the authorship identifier is included in documents authored by the entity that are hosted on the first website of the first domain;
responsive to confirming authorship of the first document by the entity, permit application of a confirmed authorship process to the first document; and
responsive to failing to confirm authorship of the first document by the entity, bar application of the confirmed authorship process to the first document.

26. The non-transitory computer readable storage medium of claim 25, further comprising instructions to determine that the first document has a non-confirmed authorship when no profile for the entity associated with the authorship identifier can be found or when the profile for the entity does not include the confirmation status for the authorship identifier.

27. The non-transitory computer readable storage medium of claim 25, wherein the authorship identifier includes an email address for a purported author of or contributor to the first document, and wherein the email address is an email address in the first domain.

28. The non-transitory computer readable storage medium of claim 27, wherein prior to conditionally confirming the authorship of the first document, the at least one program includes instructions to request that the entity confirm that the email address associated with the profile for the entity is the email address that the entity includes in documents authored by the entity.

29. The non-transitory computer readable storage medium of claim 25, wherein the authorship identifier includes a byline for a purported author of or contributor to the first document as the byline appears in documents hosted at the first domain.

30. The non-transitory computer readable storage medium of claim 29, wherein prior to conditionally confirming the authorship of the first document, the at least one program includes instructions to request that the entity confirm that the byline associated with the profile for the entity is the byline that the entity includes in documents authored by the entity hosted at the first domain.

31. The non-transitory computer readable storage medium of claim 25, wherein the authorship identifier includes an email link to an email address for a purported author of or contributor to the first document, and wherein the email address is an email address in the first domain and the email link includes a predefined authorship attribute.

32. The non-transitory computer readable storage medium of claim 31, wherein prior to conditionally confirming the authorship of the first document, the at least one program includes instructions to request that the entity confirm that the email address associated with the profile for the entity is the email address that the entity includes in documents authored by the entity.

33. The non-transitory computer readable storage medium of claim 25, wherein the profile is a profile web-page hosted at the first domain wherein the authorship of the first document is confirmed and the confirmed authorship process comprises adding the first document to the profile web-page for the entity.

34. The non-transitory computer readable storage medium of claim 25, wherein the profile is a web-page and the authorship identifier is a link to the web-page and an authorship attribute and the confirmation status link on the web-page to the first document.

35. The non-transitory computer readable storage medium of claim 25, wherein the authorship of the first document is confirmed and the confirmed authorship process comprises adding information relating to the first document to a web-page including information relating to documents that the entity authored.

36. The non-transitory computer readable storage medium of any of claim 25, wherein the authorship of the first document is confirmed and the confirmed authorship process comprises associating the first document with the entity in a search index.

* * * * *

UNITED STATES PATENT AND TRADEMARK OFFICE
CERTIFICATE OF CORRECTION

| | |
|---|---|
| PATENT NO. | : 9,177,074 B2 |
| APPLICATION NO. | : 13/608758 |
| DATED | : November 3, 2015 |
| INVENTOR(S) | : Othar Hansson et al. |

It is certified that error appears in the above-identified patent and that said Letters Patent is hereby corrected as shown below:

IN THE CLAIMS

In column 12, line 29, in claim 7, delete "in an" and insert --an--, therefor.

In column 14, line 18, in claim 25, delete "status indicates" and insert --status that indicates--, therefor.

In column 15, line 6, in claim 33, delete "domain wherein" and insert --domain and wherein--, therefor.

In column 15, line 22, in claim 36, delete "of any of" and insert --of--, therefor.

Signed and Sealed this
First Day of March, 2016

Michelle K. Lee
*Director of the United States Patent and Trademark Office*